April 10, 1928. 1,665,281
C. E. SHEARON ET AL
SAFETY AUTO CONTROL
Filed Sept. 13, 1926 3 Sheets-Sheet 1
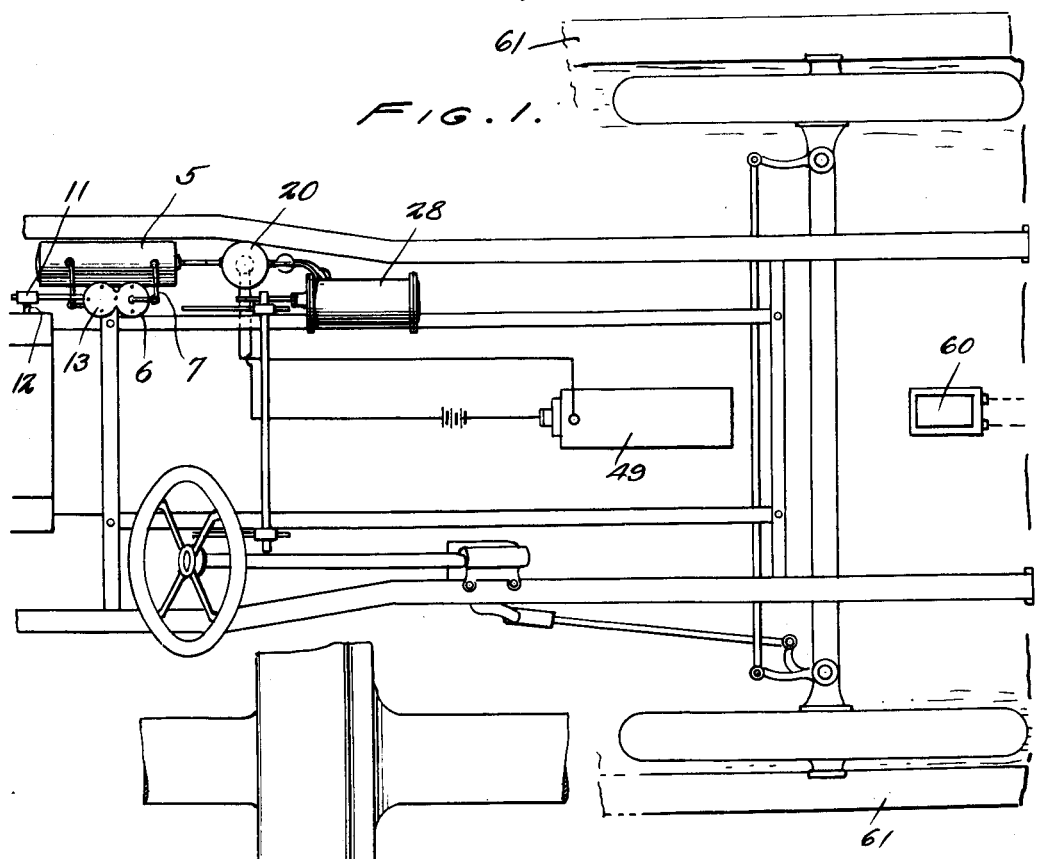
FIG. 1.
FIG. 2.
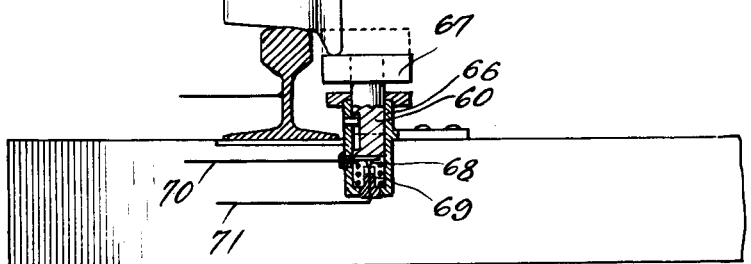
C. E. Shearon
J. D. Alexander
L. M. Pearcey
Inventors,
By C. A. Snow & Co.
ATTORNEYS.

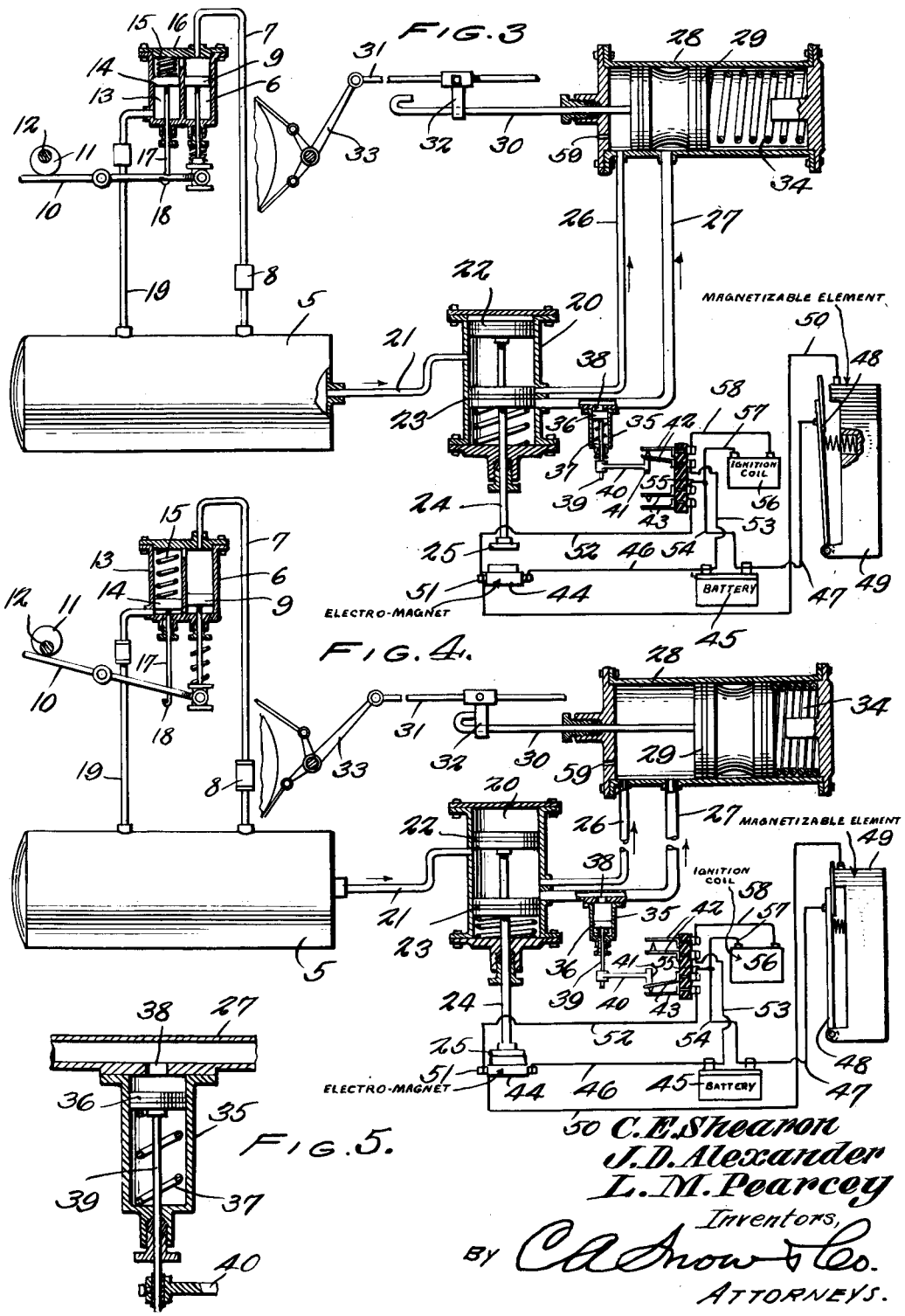

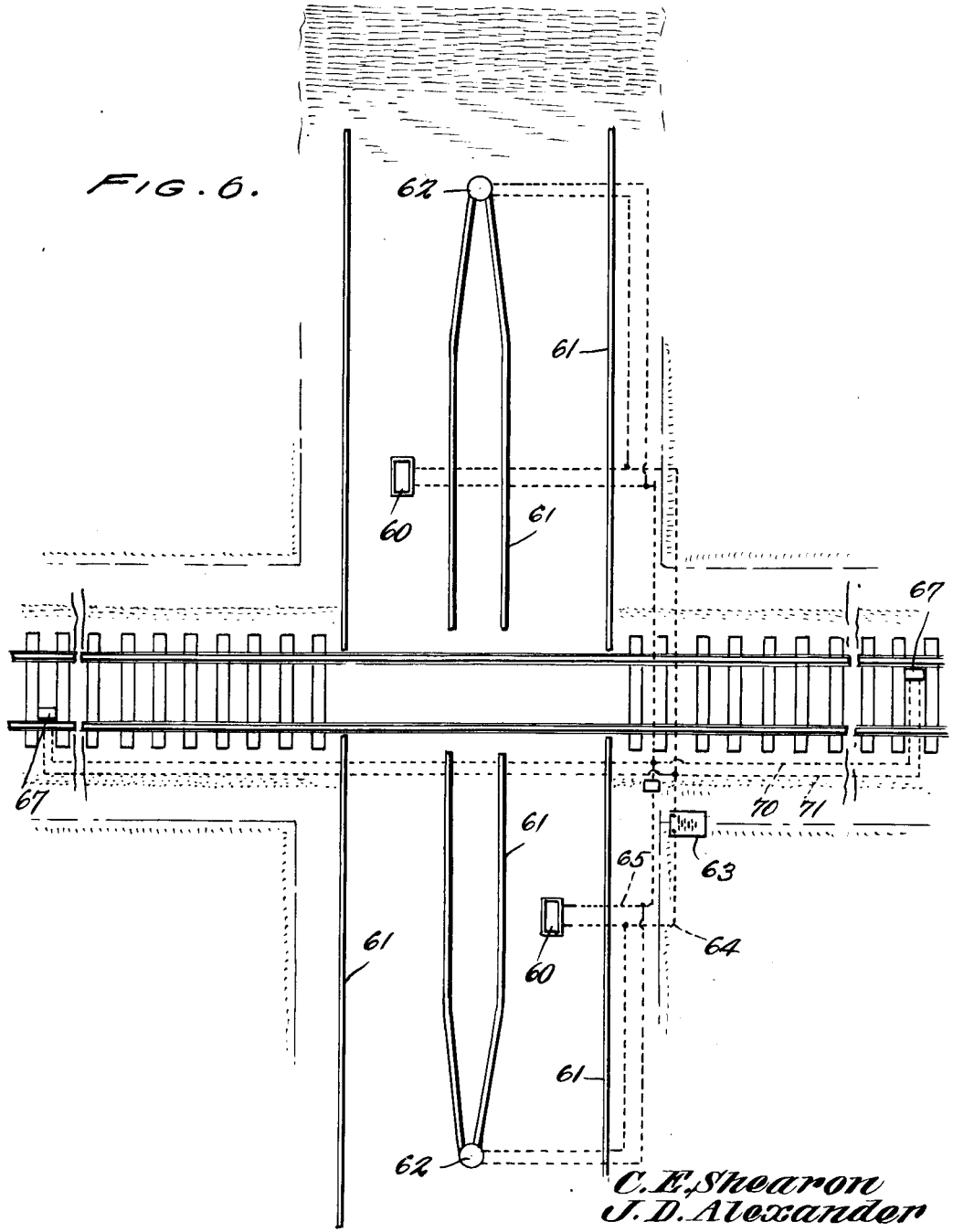

Patented Apr. 10, 1928.

1,665,281

UNITED STATES PATENT OFFICE.

CHARLES E. SHEARON, JOHN D. ALEXANDER, AND LESLIE M. PEARCEY, OF HATTIESBURG, MISSISSIPPI.

SAFETY AUTO CONTROL.

Application filed September 13, 1926. Serial No. 135,268.

The present invention relates to a safety control device especially designed for use at railway crossings, and aims to provide novel means whereby the emergency brakes of a motor vehicle will be automatically applied and the ignition automatically cut off, when a train and motor vehicle are simultaneously approaching the crossing and are in danger of colliding.

An important object of the invention is to provide a device of this character which may be readily and easily installed, utilizing the electric energy of the battery employed in the usual block system of the railway system, as well as the battery supplying energy to the motor vehicle.

A further object of the invention is to provide a device of this character wherein the brakes of the vehicle will be held in their active or braking positions for a predetermined period or for such length of time as required for the train to pass the crossing.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawings:

Figure 1 is a diagrammatic view illustrating the apparatus as installed on a motor vehicle.

Figure 2 is a fragmental sectional view through a railway rail and illustrating a car wheel and mechanism operated by the car wheel to complete a circuit.

Figure 3 is a diagrammatic view of the mechanism carried by the motor vehicle, showing the mechanism for operating the brakes in its inactive position.

Figure 4 is a diagrammatic view illustrating the brake control mechanism in its active position.

Figure 5 is a sectional detail view of one of the switch operating mechanisms.

Figure 6 is a diagram illustrating a railway crossing and operating mechanism applied thereto.

Referring to the drawings in detail, the mechanism which is carried by the vehicle, embodies a main or storage tank 5 supported by the chassis of the motor vehicle, in any well known manner, the tank being in communication with the pump 6, through the pipe 7 that is applied with a suitable check valve 8 that controls the passage of air to the tank 5.

The reference character 9 indicates the pump piston which operates to force air through the pipe line into the tank 5, the pump piston being operated by means of the arm 10 engaged by the cam 11 carried by the shaft 12 forming a part of the motor vehicle construction. Thus it will be seen that as the cam 11 rotates, the arm 10 will be oscillated to operate the piston.

Associated with the pump 6 is a cylinder 13 in which the piston 14 operates, the piston being normally held downwardly by the action of the coiled spring 15, which is shown as engaging the piston and having one end thereof contacting with the head 16 of the cylinder.

As shown, the piston embodies a rod 17 formed with a hook 18 at its free end, which hook is designed to engage the arm 10 in a manner as clearly illustrated by Figure 3. The reference character 19 indicates a pipe which establishes communication betweeen the cylinder 13 and tank 5 to place the piston 14 under the action of the air pressure in the tank 5, the air pressure overcoming the action of the spring 15 and moving the piston towards the head 16 of the cylinder. Thus it will be seen that when the pressure in the tank 5 is sufficient to overcome the action of the spring 15, the piston 14 will move against the action of the spring 15 and the hook portion 18 of the rod 17 will tilt the arm 10 to move the same out of engagement with the cam 11 to cut off the supply of air to the tank 5.

Cylinder 20 also forms a part of the mechanism and is in communication with the tank 5 through pipe 21 as shown by Figure 3. Operating within the cylinder 20 are the spaced pistons 22 and 23 respectively, the pistons being mounted on the rod 24 that carries the armature 25 at its free end. As shown, the piston 23 normally closes pipe lines 26 and 27 that lead to the cylinder 28, to the end that the piston 23 controls the flow of air through the pipes 26 and 27, for purposes to be hereinafter more fully described.

Operating within the cylinder 28 is a piston 29 that is mounted on one end of the rod 30, which in turn is connected with the brake rod 31 by means of the adjustable connection 32, the brake rod having connection with the brake band arm 33 in the usual and well known manner. Positioned within the cylinder 28 is a coiled spring 34 which engages one end of the piston 29 to normally urge the same in one direction to hold the brake rod 31 released.

Communicating with the pipe 27 is a valve cylinder 35 in which the piston 36 moves, the piston 36 being normally held to its closed position by means of coiled spring 37, but adapted to move against the action of the spring 37 when pressure is directed to the cylinder 35 through the opening 38.

The piston 36 is carried at one end of the rod 39, which rod supports the arm 40 supplied with the head 41 to engage the switch members 42 to complete the circuit to the ignition system of the motor vehicle when the arm is in its normal position or in a position as illustrated by Figure 3 of the drawings.

As illustrated by Figure 4 of the drawings, the arm 40 has been moved by air pressure in the cylinder 35, to its lowermost position where it contacts with the switch members 43 completing the circuit to the magnet 44. This magnet 44 is in circuit with the battery 45 of the vehicle electric system, through wire 46 and wire 47, the latter wire being in circuit with the switch arm 48 operating adjacent to the magnetized member 49 that is carried under the car for purposes to be hereinafter more fully described.

The wire 50 constitutes the return wire of the circuit and connects with the magnet 44 at 51. The wire 52 also connects with the magnet 44 and completes a circuit to the switch members 43. Wire 53 connects with the battery 45 and connects with one of the switch members 42 while the wire 54 completes a circuit to the opposite switch members 43 through the wire 55 which wire 55 also connects with the ignition coil 56, through the wire 57. The return wire of the ignition coil is indicated at 58.

From the foregoing it will be obvious that when the magnetized member 49 is energized, the switch arm 48 is moved to complete a circuit through wires 47, 50, magnet 44, wire 46 and battery 45, energizing the magnet 44 to draw the armature 25 thereof downwardly, uncovering the ends of pipes 26 and 27, that are supported within the cylinder 20, allowing air to enter the cylinder 28 to move the piston 29 to the right, with the result that the brake bands which are connected with arm 33 are moved to their active positions as illustrated by Figure 4. Simultaneous with this movement, the piston 36 moves downwardly under the action of the air passing through pipe 27, disconnecting the switch members 42 and breaking the circuit to the ignition coil 56 to cause the motor with which the device is associated, to stop.

As the arm 40 moves downwardly, the head 41 thereof contacts with the switch members 43 to move them to positions to complete the circuit to the magnet 44 and hold the armature 25 in a position as shown by Figure 4 until the air pressure in the cylinder 35 is released whereupon the coiled spring 37 will act to return the piston 36 to its initial position, the head 41 thereof contacting with the members 42 to complete the circuit to the ignition coil of the system.

A bleed opening 59 is provided in the cylinder 28, which opening is so constructed that it will permit the air in the cylinder 28 to bleed therefrom, to the end that the apparatus will be held in its active position for a predetermined period, or sufficiently long to allow the train approaching the cross road, to pass.

Operating in conjunction with the apparatus carried by the motor vehicle is a magnet 60 which is positioned in the road surface over which the motor vehicle must travel and disposed at a point in such spaced relation with the railway track that ample time will be had for the stopping of the vehicle before it reaches the track.

In order to insure the motor vehicle passing over a magnet, curbings 61 are provided and divide the roadway into lateral passageways, there being provided signaling lamps 62 at the ends of the curbings to insure against persons running into the curbings on passing along the road surface.

These magnets 60 are arranged on opposite sides of the track, one in each passageway as clearly shown by Figure 6 of the drawings, the magnets being in circuit with the battery 63 that supplies electric energy to the usual block signaling system of the railway, through the wires 64 and 65, the battery 63 being also in circuit with the switch member 66 that embodies a vertically movable plunger 67 carrying a contact member 68 at its lower end, which contact member 68 is designed to engage the contact member 69 when the plunger 67 is depressed by the flange of a car wheel passing thereover, such action being clearly illustrated by Figure 2 of the drawings.

The wires completing the circuit between the switch member 66 and battery 63 are indicated at 70 and 71 respectively.

From the foregoing it will be obvious that when a train and motor vehicle are simultaneously moving towards a crossing, and the train and vehicle are dangerously close to the crossing, the flanges of the car wheels will pass over the plunger 67 depressing the plunger causing the switch members associated therewith to complete the circuits to the magnets associated therewith, with the result that as the motor vehicle passes over the magnet 60 in the road surface, the magnetized member 49 carried by the motor vehicle and which is disposed in such position that it must pass directly over the magnet 60 will be energized, to the end that the armature 48 thereof will be drawn towards the magnetized member 49 completing a circuit to the switch members and solenoid to operate the pistons and release the air for actuating the brakes of the vehicle, as previously described.

We claim:

1. A safety device for railway crossings including a switch member between rails of a track and in the path of travel of the wheels of a train passing over the rails, a magnet positioned in a road surface crossing the railway and in circuit with the switch, a brake operating mechanism carried by a motor vehicle passing over the road surface, and said brake operating mechanism including a magnet and fluid pressure controlled means actuated by the action of the magnet for applying the brakes of the motor vehicle.

2. A safety device for railway crossings including a switch member adapted to be actuated by a car passing over the rails of the railway track, a magnet in circuit with the switch and arranged in a roadway crossing the railway tracks, a magnet carried by a motor vehicle passing over the roadway, the last mentioned magnet adapted to be energized by the first mentioned magnet when the vehicle passes thereover, a switch member operated by the second mentioned magnet, and means controlled by the action of the switch member for applying the brakes of the motor vehicle.

3. A safety device for railway crossings including a switch member positioned to be operated by a train passing over the railway, a magnet arranged within a roadway and in circuit with the switch to be energized by the action of the switch, a magnet carried by a motor vehicle moving over the roadway, means controlled by the action of the second mentioned magnet for applying the brakes, and means for simultaneously breaking the ignition circuit of the motor vehicle.

4. A safety device for railway crossings including a switch member positioned to be operated by cars passing over the railway, a magnet disposed in a roadway crossing the railway, and adapted to be energized by the action of the switch completing a circuit thereto, a magnet carried by a motor vehicle passing over the roadway, the magnet carried by the motor vehicle being located to pass over the magnet in the roadway to be energized by the first mentioned magnet, brake actuating means carried by the motor vehicle and controlled by the operation of the second mentioned magnet, and said brake actuating mechanism adapted to hold the brakes in their active positions for a predetermined length of time.

5. A safety device for railway crossings including a switch member adapted to be actuated by the movement of a train thereover, a magnet in circuit with the switch member and disposed in a roadway crossing the railway, a brake actuating mechanism carried by the vehicle passing over the roadway, said brake actuating mechanism embodying cylinders and pistons, a magnet carried by the vehicle and adapted to be energized by the first mentioned magnet, a valve for controlling the passage of fluid through the cylinders and pistons, and means controlled by the action of the second mentioned magnet for setting the valve to release air in the cylinders.

6. A safety device for railway crossings including a switch member positioned to be operated by a train passing over the railway, a magnet disposed in a roadway and in circuit with the switch, a brake actuating mechanism carried by a vehicle passing over the roadway, said brake actuating mechanism including an air supply tank, a cylinder, a piston operating in the cylinder and having a piston rod, said piston rod having connection with the brake rod of the vehicle, means disposed between the air supply tank and cylinder for admitting air to the cylinder, and means controlled by the action of the second mentioned magnet for controlling the fluid controlled means.

7. A safety device for railway crossings including a switch member positioned to be operated by a train passing over the railway, a magnet in a road surface crossing the railway and in circuit with the switch, a brake operating mechanism carried by a vehicle passing over the roadway, a circuit breaking means forming a part of the brake operating mechanism, said circuit breaking means adapted to break the circuit to the ignition system of the motor vehicle, a magnet forming a part of the brake operating mechanism and adapted to be energized by the first mentioned magnet, and means controlled by the second mentioned magnet for operating the circuit breaking mechanism and brake actuating mechanism.

8. A safety device for railway crossings including a switch member positioned adjacent to the rails of a railway track and adapted to be actuated by the passage of a train thereover, a magnet in a roadway crossing the railway track and in circuit with the switch to be controlled thereby, a motor vehicle ignition breaking mechanism including pairs of spaced contact members, a magnet carried by the motor vehicle and adapted to be energized when passing over the first mentioned magnet, pneumatically controlled means for holding the spaced contact members into engagement with each other, and fluid pressure means controlled by the action of the second mentioned magnet for holding the pneumatically controlled means in its active position.

9. A safety device for railway crossings including a switch member positioned adjacent to the rails of a track to be operated by the passing of a train over the rails, a magnet positioned in a roadway crossing the railway and in circuit with the switch member, a brake actuating mechanism carried by the vehicle passing over the roadway, said brake actuating mechanism including a magnet, to be energized by the first mentioned magnet, said brake actuating mechanism including a cylinder and piston, means for supplying air to the cylinder to operate the piston, said piston being connected to the brake actuating rod of the vehicle, a piston valve controlling the passage of air under pressure to the cylinder, and means controlled by the action of the second mentioned magnet for holding the piston valve in its active position.

In testimony that we claim the foregoing as our own, we have hereto affixed our signatures.

CHARLES E. SHEARON.
JOHN D. ALEXANDER.
LESLIE M. PEARCEY.